(12) United States Patent
Shen et al.

(10) Patent No.: US 8,199,472 B2
(45) Date of Patent: Jun. 12, 2012

(54) FLAT PANEL DISPLAY WITH SUPPORT PROVIDING PIVOTING

(75) Inventors: Rui-Ye Shen, Shenzhen (CN); Su-Sheng Mong, Miao-Li (TW); Te-Hsu Wang, Miao-Li (TW)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 264 days.

(21) Appl. No.: 12/650,500

(22) Filed: Dec. 30, 2009

(65) Prior Publication Data
US 2010/0172073 A1 Jul. 8, 2010

(30) Foreign Application Priority Data
Jan. 6, 2009 (CN) .......................... 2009 1 0300077

(51) Int. Cl.
*G06F 1/16* (2006.01)
(52) U.S. Cl. ........... 361/679.21; 361/679.22; 361/679.6; 248/921; 248/922; 248/923
(58) Field of Classification Search ............. 361/679.21, 361/679.22
See application file for complete search history.

(56) References Cited

U.S. PATENT DOCUMENTS

| 4,989,813 A | 2/1991 | Kim et al. |
| 5,709,360 A * | 1/1998 | Rosen ........................ 248/278.1 |
| 5,963,421 A * | 10/1999 | Moss et al. ............... 361/679.21 |
| 6,954,221 B2 * | 10/2005 | Wu .......................... 361/679.21 |
| 7,694,922 B2 * | 4/2010 | Kim .......................... 248/176.1 |
| 7,835,146 B2 * | 11/2010 | Zhou ........................ 361/679.29 |
| 2005/0247832 A1 | 11/2005 | Cho et al. |
| 2006/0126283 A1 * | 6/2006 | Ho ............................... 361/681 |
| 2007/0121280 A1 * | 5/2007 | Yang ............................. 361/681 |
| 2007/0223185 A1 | 9/2007 | Wang et al. |
| 2008/0035802 A1 * | 2/2008 | Kim ......................... 248/123.11 |

FOREIGN PATENT DOCUMENTS

| CN | 1693957 A | 11/2005 |
| CN | 201054100 Y | 4/2008 |
| TW | 200737963 A | 10/2007 |

* cited by examiner

*Primary Examiner* — Anthony Q Edwards
(74) *Attorney, Agent, or Firm* — Altis Law Group, Inc.

(57) ABSTRACT

An exemplary flat panel display includes a seat, a connection member, and a display module. The seat includes a supporting member having a first engaging portion at a top end thereof, and the first engaging portion includes two pins and two fixing holes. The connection member includes two fixing components. The display module is mounted on the supporting member, and includes a second engaging portion having two positioning slots. The pins of the first engaging portion are received in the second engaging portion, the fixing components are fixed in the fixing holes via the positioning slots, and the positioning slots provide paths for the fixing components when the display module is rotated about the pins.

20 Claims, 8 Drawing Sheets

FLAT PANEL DISPLAY WITH SUPPORT PROVIDING PIVOTING

BACKGROUND

1. Technical Field

The present disclosure relates to flat panel displays (FPDs), and more particularly, to an FPD with a support that enables the FPD to be pivoted.

2. Description of Related Art

A typical FPD includes a display module for displaying images, and a support module. The display module may be pivotably mounted on the supporting module.

In one kind of pivotable display module, the display module is tiltable. That is, the tilt angle of the display module is adjustable to meet varying needs for different viewing positions.

However, in commonly used FPD configurations, the mechanism provided for adjusting the tilt angle is complicated. For example, in a typical FPD, a plurality of mechanical elements is adopted in the support module to enable the display module to be tilted to a desired angle. Due to the multiple mechanical elements, the connection between the display module and the support module is relatively complex, and the cost of the FPD is correspondingly high.

What is needed, therefore, is an FPD that can overcome the described limitations.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe certain exemplary embodiments of the present disclosure in detail.

Figure 1:
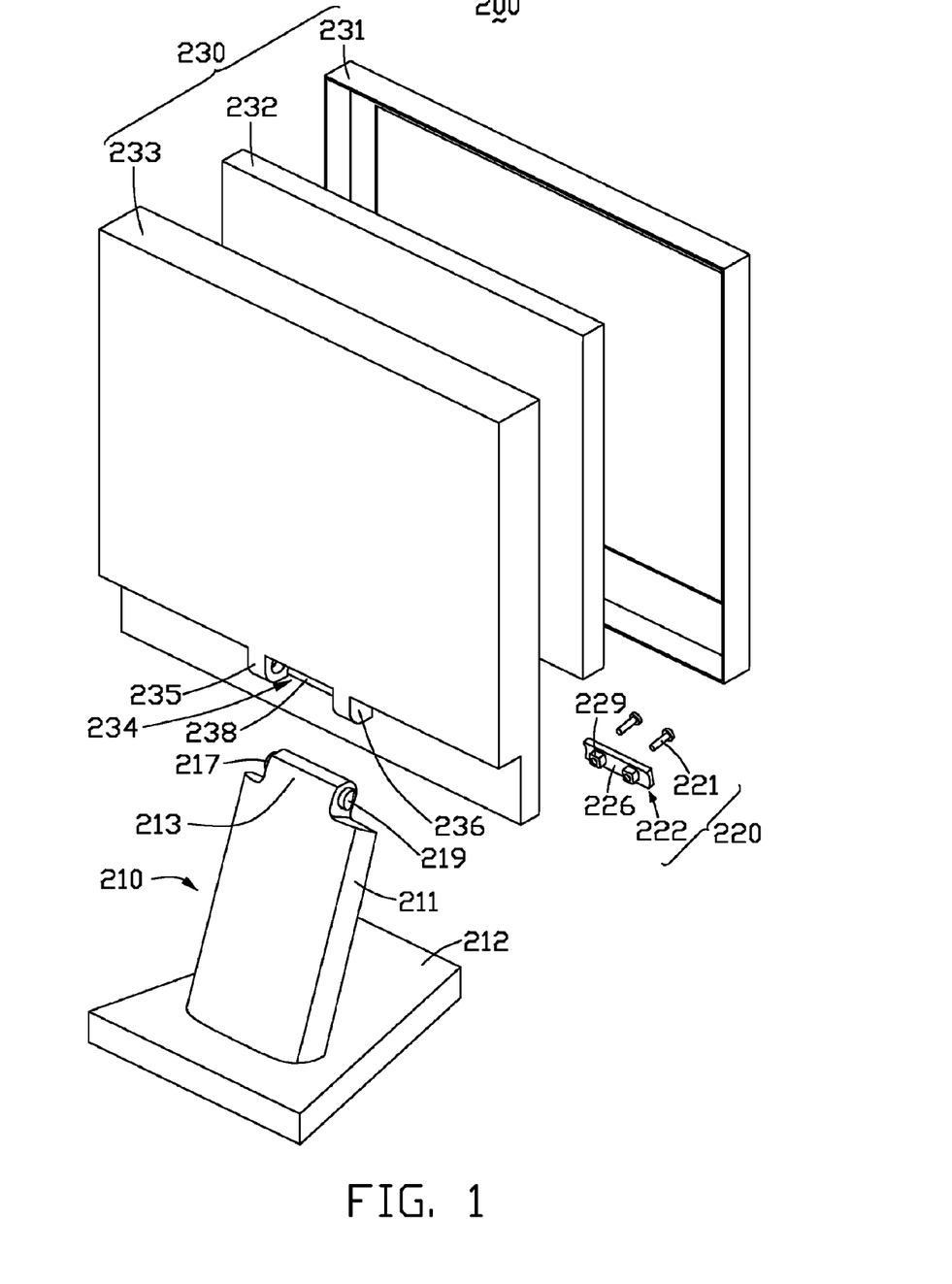
FIG. 1 is an exploded, isometric rear view of an FPD according to an exemplary embodiment of the present disclosure, the FPD including a display module.
Figure 2:
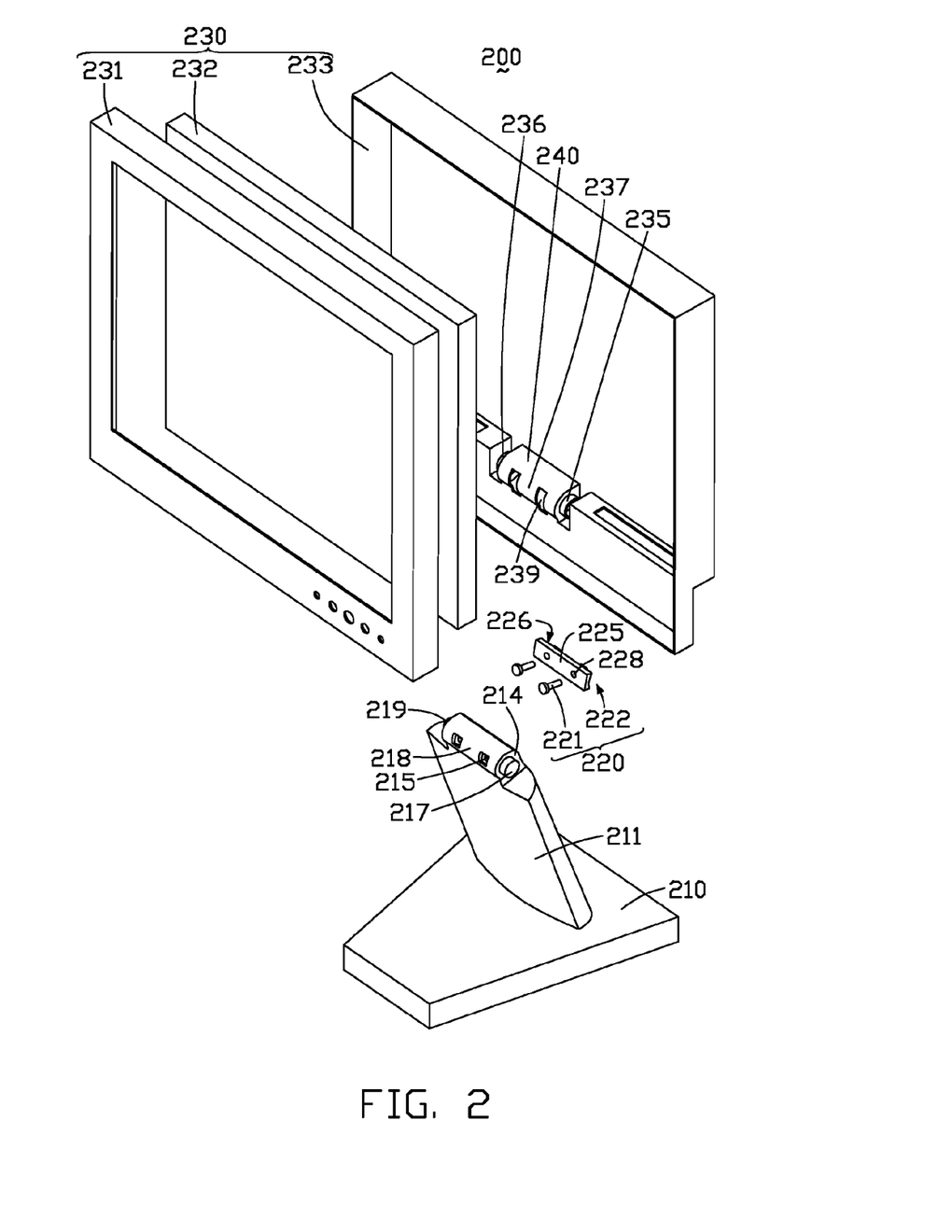
FIG. 2 is an exploded, isometric front view of the FPD of FIG. 1.

Referring to FIGS. 1-2, an FPD 200 according to an exemplary embodiment of the present disclosure is shown. The FPD 200 includes a seat 210, a connection member 220, and a display module 230. The display module 230 is pivotably mounted on the seat 210 via the connection member 220.

The seat 210 includes a base 212, a supporting member 211, and a first engaging portion 213. The supporting member 211 is mounted on the base 212, and may be an arm. The first engaging portion 213 is formed on an upper end of the supporting member 211. In the illustrated embodiment, the first engaging portion 213 is integrally formed with the main body.

The first engaging portion 213 is substantially columnar in form, and includes a roughened, curved front surface 218, and two sides 214. A pair of fixing holes 215 is disposed at the curved front surface 218. Moreover, a first pin 217 and a second pin 219 may horizontally extend from the two sides 214 of the first engaging portion 213, respectively. The first pin 217 and the second pin 219 are both cylindrical or columnar in form. An axial length of the first pin 217 may be slightly greater than that of the second pin 219.

In one embodiment, the first pin 217 and the second pin 219 can be integrally formed with the first engaging portion 213. However, in an alternative embodiment, the first pin 217 and the second pin 219 can instead be separate elements respectively disposed at the two sides 214 of the first engaging portion 213. Furthermore, in another alternative embodiment, the first pin 217 and the second pin 219 may be substituted with a single fin that passes through the first engaging portion 213.

The display module 230 includes a front frame 231, a display panel 232, and a rear shell 233. The front frame 231 and the rear shell 233 can be attached together, cooperating with each other to form an accommodating space for receiving the display panel 232. The display panel 232 can be a liquid crystal display (LCD) panel, an electro-luminescence (EL) panel, an organic light emitting diode (OLED) panel, or another kind of display panel.

The rear shell 233 of the display module 230 may include a second engaging portion 234. The second engaging portion 234 may be positioned at substantially the center of a bottom end of the rear shell 233.

The second engaging portion 234 includes a first block 235 and a second block 236 opposite each other, and a curved plate 240 between the two blocks 235, 236. The blocks 235, 236 may directly extend down from a bottom end or a lower step portion of the rear shell 233. In the illustrated embodiment, the blocks 235, 236 directly extend down from a lower step portion of the rear shell 233. The first block 235, the second block 236, and the curved plate 240 cooperatively form a receiving portion for receiving the first engaging portion 213 therein.

The curved plate 240 may be a part of a wall of the rear shell 233, and the curved plate 240 and the rear shell 233 may be formed as a single piece. In particular, the curved plate 240 may correspond in shape to the curved front surface 218 of the first engaging portion 213. The curved plate 240 includes a first friction surface 238 on an outer side thereof (i.e. farthest from the display panel 232), and a second friction surface 237 on an inner side thereof (i.e. adjacent to the display panel 232). The first friction surface 238 and the second friction surface 237 are both roughened and thereby capable of providing frictional force.

Moreover, a pair of positioning slots 239 is defined in the curved plate 240. The positioning slots 239 are through slots. Each positioning slot 239 corresponds to a respective one of the fixing holes 215 of the first engaging portion 213. A height of each positioning slot 239 is greater than a height of the corresponding fixing hole 215.

The first block 235 and the second block 236 each include a pivot hole (not labeled) for receiving the corresponding pin 217 or 219 of the first engaging portion 213. Thereby, the display module 230 is able to rotate about the pins 217 and 219.

The connection member 220 includes a pair of fixing components 221 and a gasket plate 222. Each of the fixing components 221 is configured to rotatably fix the second engaging portion 234 of the rear shell 233 to the first engaging portion 213 of the seat 210. In particular, each fixing component 221 may be a threaded fastener such as a threaded bolt.

The gasket plate 222 includes a fixing surface 225 and a contacting surface 226 at opposite sides thereof. The contacting surface 226 is configured to contact the second friction surface 237 of the second engaging portion 234, and corresponds in shape to the second friction surface 237. For example, the contacting surface 226 may be curved. Moreover, the gasket plate 222 also includes a pair of stopping blocks 229 disposed on the contact surface 226. The stop blocks 229 can be received in the positioning slots 239, and when the display module 230 is tilted to a maximum angle in either forward or backward directions, each stop block 229 reaches a respective end of the corresponding positioning slot 239. The stop blocks 229 thereby prevent the display module 230 from being over-tilted in forward or backward directions.

In addition, a pair of through holes 228 is defined in the gasket plate 222. Each through hole 228 corresponds to a respective fixing hole 215. The fixing components 221 can pass though the through holes 228 of the gasket plate 222, and the positioning slots 239 of the curved plate 240, and be fixed in the fixing holes 215 of the first engaging portion 213. In the illustrated embodiment, the through holes 228 are both threaded through holes.

Figure 3:
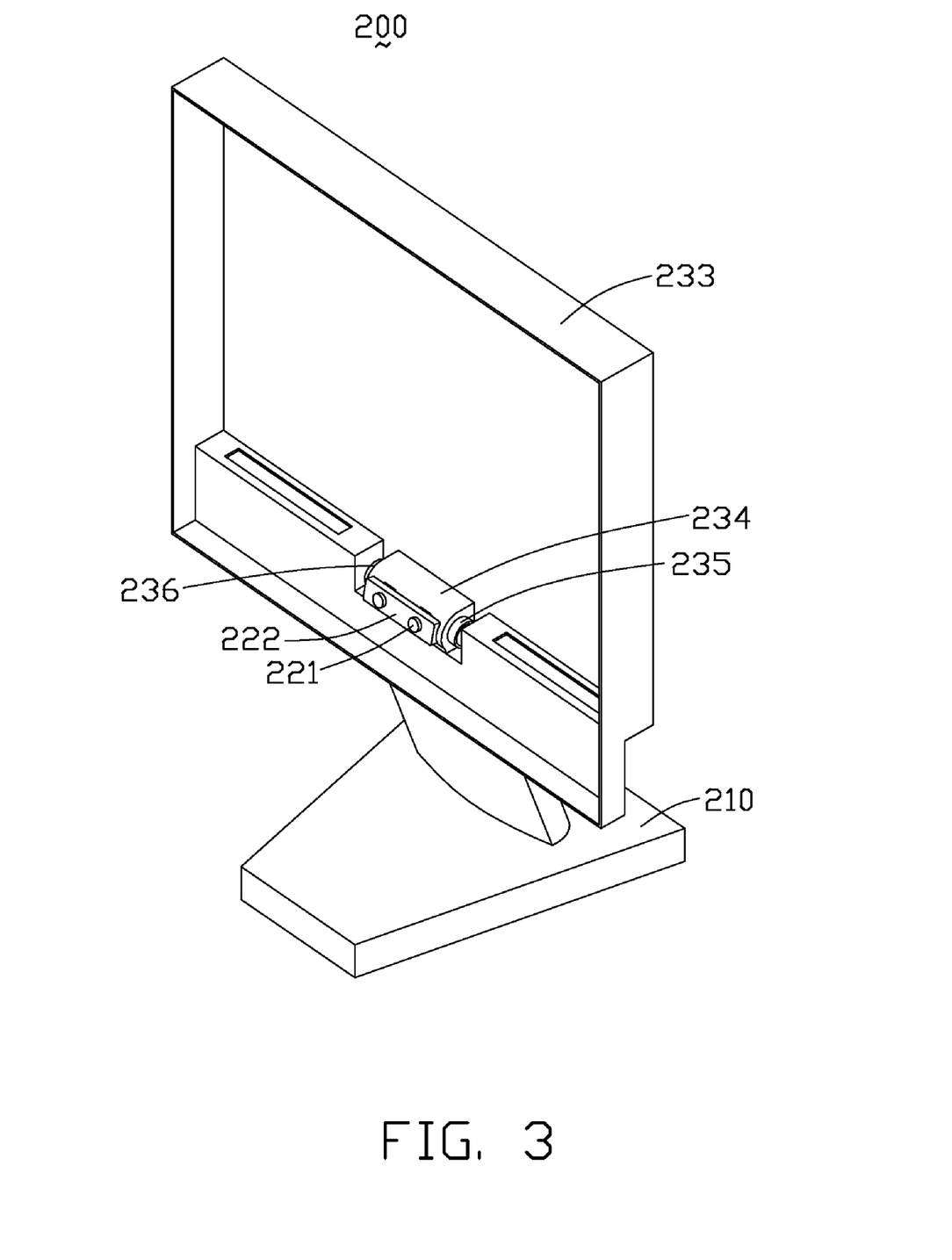
FIG. 3 is an assembled view of part of the FPD of FIG. 2.
Figure 4:
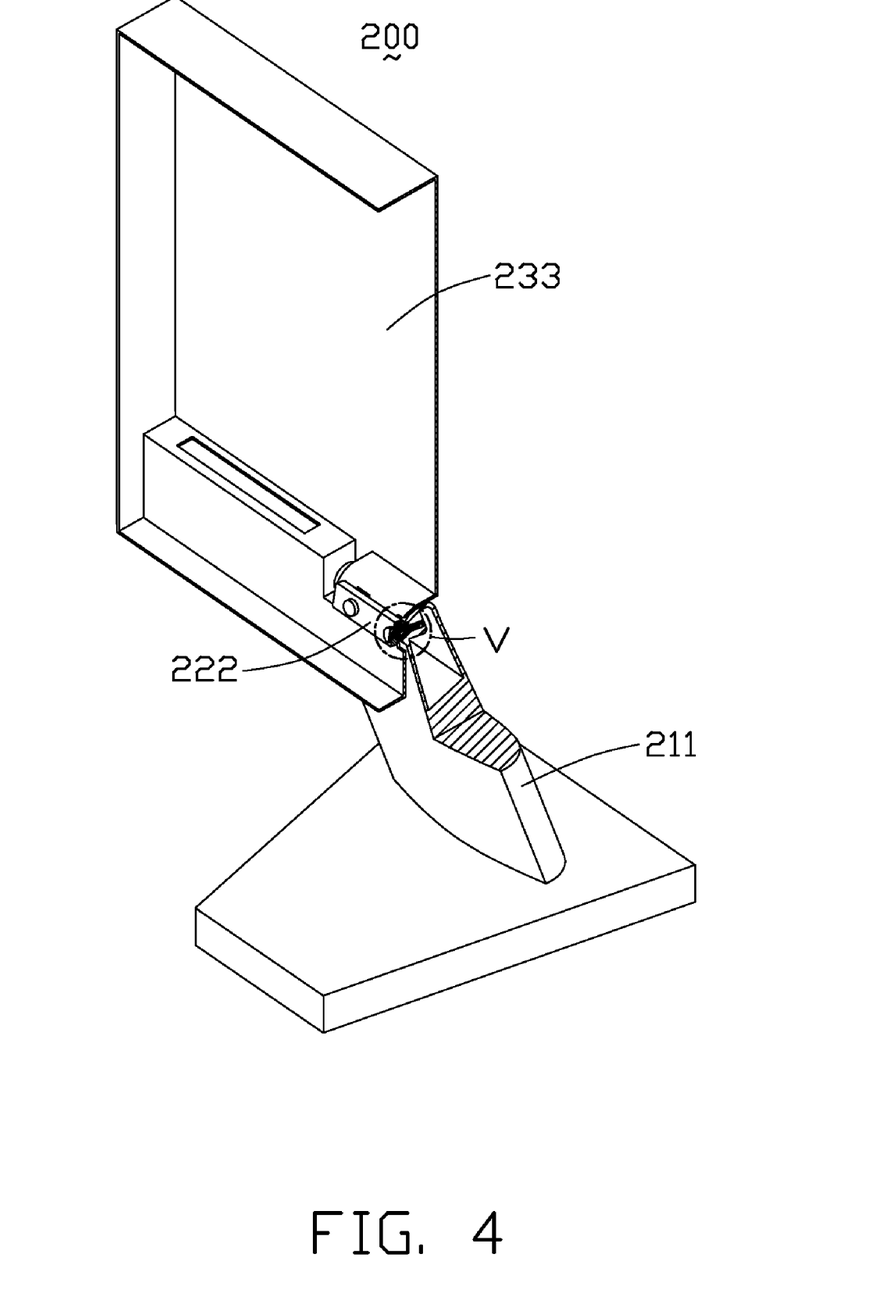
FIG. 4 is similar to FIG. 3, but with part of the FPD cut away.
Figure 5:
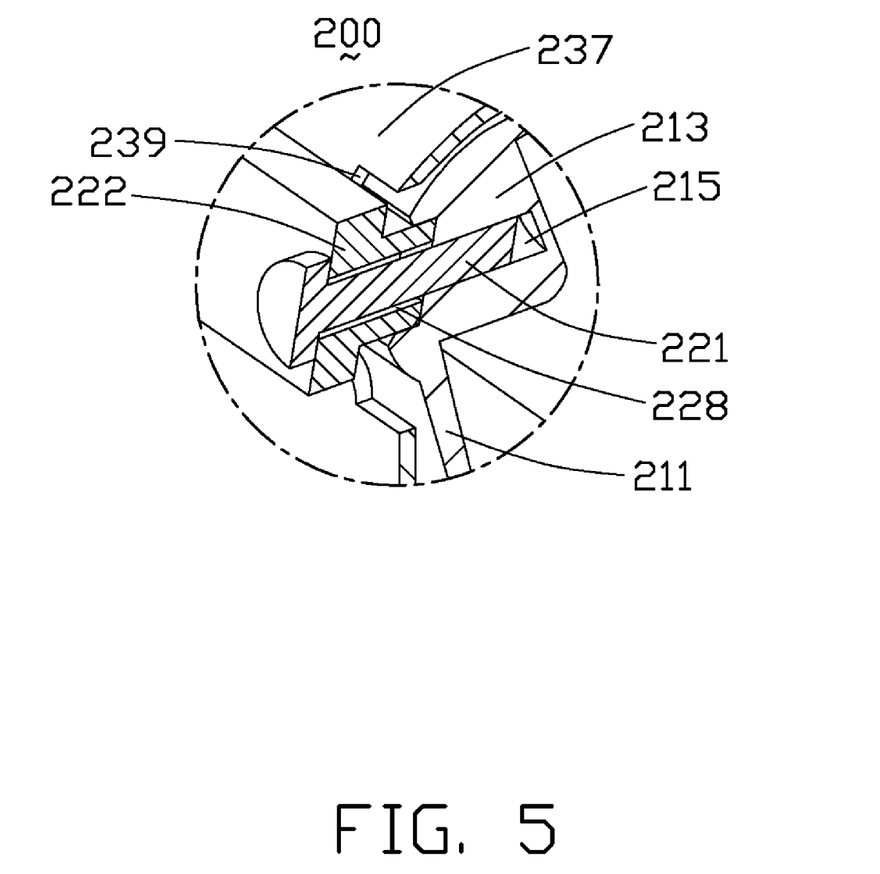
FIG. 5 is an enlarged view of a circled portion V of FIG. 4.

Referring to FIGS. 3-5, during assembly, firstly, the first engaging portion 213 is received in the receiving portion of the second engaging portion 234, with the first pin 217 and the second pin 219 being respectively received in the pivot holes of the blocks 235, 236. Thereby, the curved front surface 218 of the first engaging portion 213 and the first friction surface 238 of the second engaging portion 234 contact, and each positioning slot 239 of the second engaging portion 234 is aligned with the corresponding fixing hole 215 of the first engaging portion 213.

Secondly, the gasket plate 222 is positioned to contact the second friction surface 237 of the second engaging portion 234. The fixing components 221 are passed sequentially through the through holes 228 of the gasket plate 222 and the slots 239 of the second engaging portion 234, and are threadedly engaged in the fixing holes 215 of the first engaging portion 234. Thereby, the gasket plate 222 is sandwiched between heads of the fixing components 221 and the second friction surface 237 of the second engaging portion 234. Thus, the rear shell 233 is rotatably attached to the seat 210.

Thirdly, the display panel 232 is received in the rear shell 233, and the front frame 231 is fixed to the rear shell 233. The FPD 200 is thus assembled.

Utilizing the described configuration, after assembly, the display module 230 is capable of tilting about the seat 210. A pivot axis (not labeled) of such tilting runs through the first and second pins 217 and 219. That is, in the FPD 200, a tilt angle of the display module 230 is adjustable.

Figure 6:
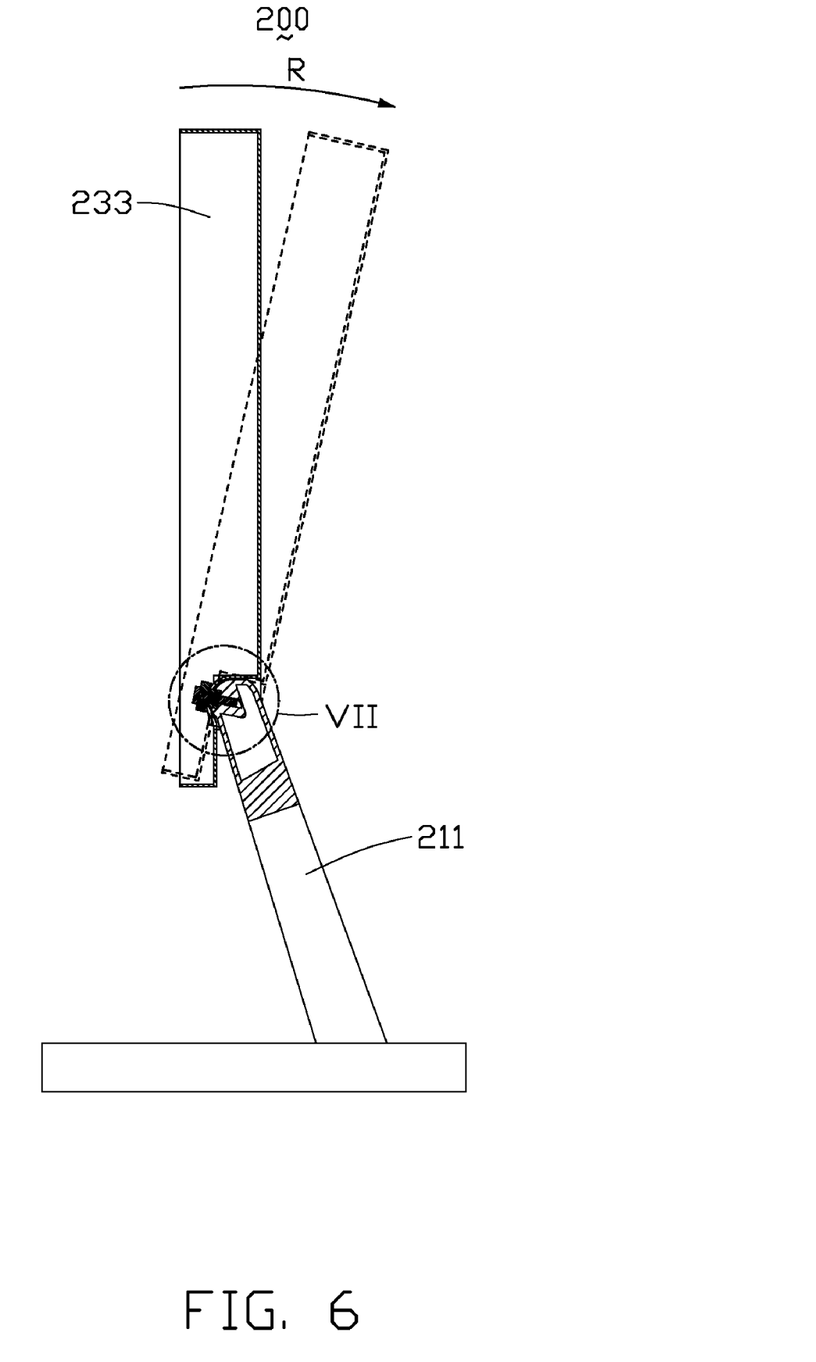
FIG. 6 is a side plan view of the FPD corresponding to the view shown in FIG. 4, illustrating tilt angle adjustment of the display module.
Figure 7:
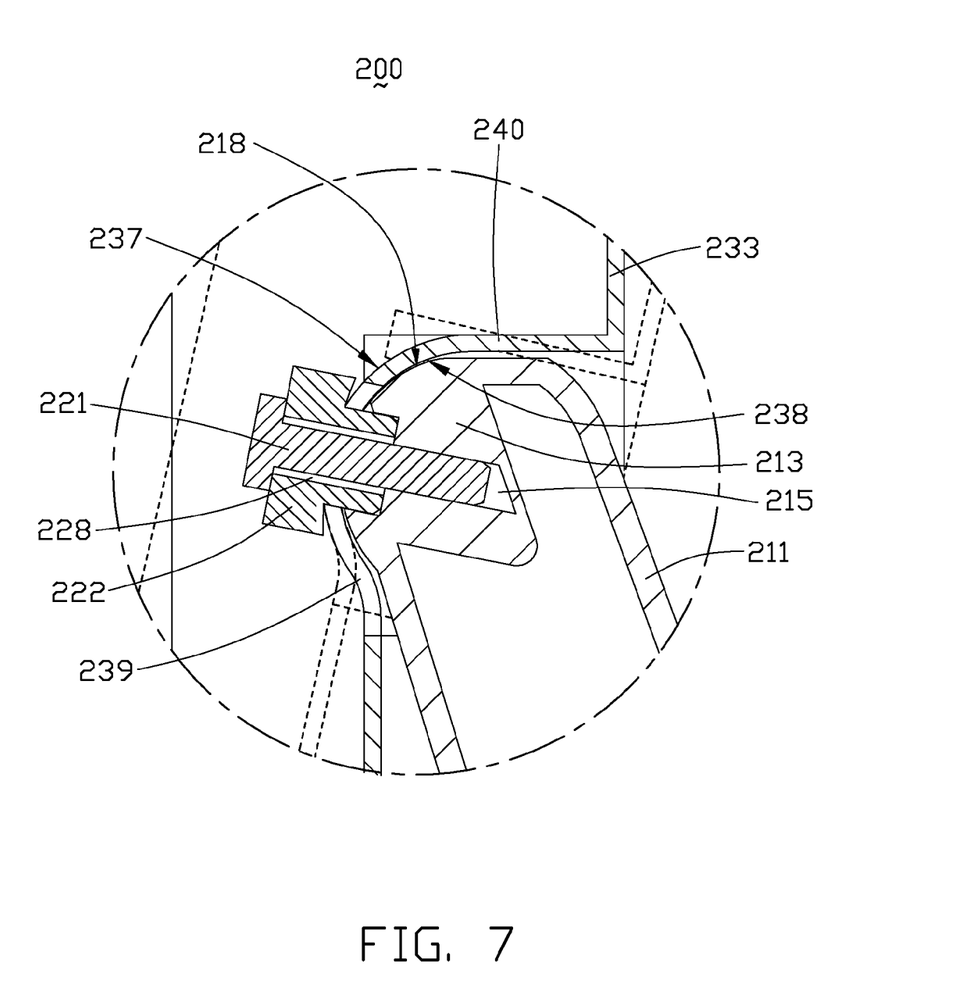
FIG. 7 is an enlarged view of a circled portion VII of FIG. 6.

Referring to FIGS. 6-7, to adjust the tilt angle of the display module 230, an external force R is applied on the display module 230 by a user. Due to the external force R, the display module 230 rotates about the first and second pins 217, 219 respectively received in the pivot holes of the blocks 235, 236. During rotation of the display module 230, the fixing components 221 travel respectively along paths provided by the positioning slots 239 of the second engaging portion 234.

Once the display module 230 reaches a desired angle, the external force R is removed. Friction provided by the first friction surface 238 and the second friction surface 237 of the curved plated 240 maintains the preferred tilt position of the display module 230.

In detail, when the display module 230 tilts to the desired angle, a first friction force is generated between the first friction surface 238 of the second engaging portion 234 and the curved front surface 218 of the first engaging portion 213, and a second friction force is generated between the second friction surface 237 of the second engaging portion 234 and the contacting surface 226 of the gasket plate 222. The first friction force and the second friction force cooperate to counteract gravitational force acting on the display module 230 after the external force R is removed. Thus, the desired tilt position of the display module 230 is maintained when the external force R is removed.

In the FPD 200, the positioning slots 239 are defined in the display module 230, and the fixing components 221 fix the display module 230 to the seat 210 via the positioning slots 239. The positioning slots 239 provide paths along which the fixing components 221 can travel. That is, the positioning slots 239 can guide the fixing components 221 when the fixing components 221 travel therein, to enable the display module 230 to be conveniently and safely tilted to a desired tilt angle. Compared with existing FPDs, the configuration and mechanism provided for adjustment of the tilt angle of the display module 230 in the FPD 200 is relatively simple. Thereby, the overall cost of the FPD 200 can be reduced.

Figure 8:
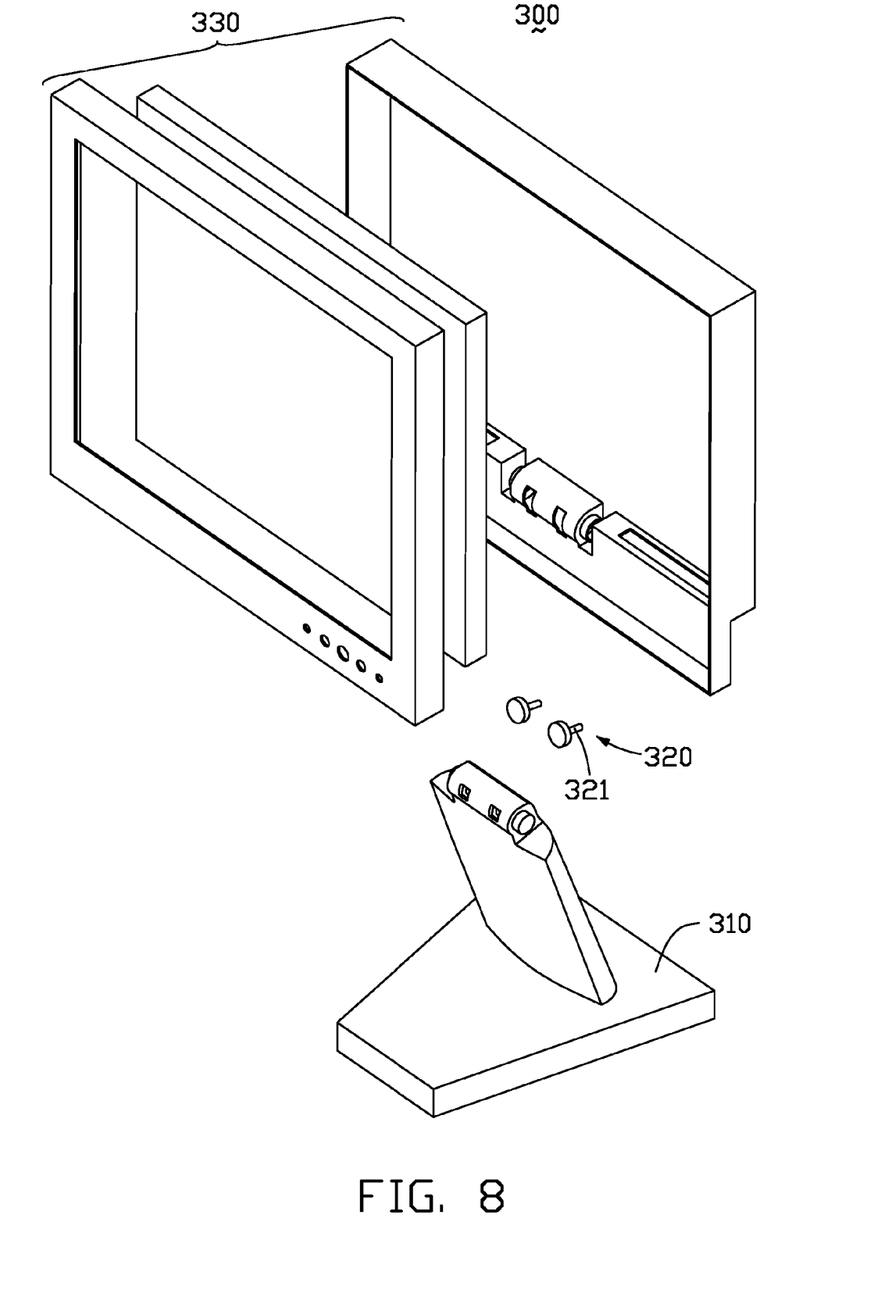
FIG. 8 is an exploded, isometric front view of an FPD according to another exemplary embodiment of the present disclosure.

FIG. 8 is an isometric view of an FPD 300 according to another embodiment of the present disclosure. The FPD 300 differs from the FPD 200 only in that a connection member 320 of the FPD 300 includes only a pair of fixing components 321. The fixing components 321 are configured to fix a display module 330 to a seat 310, with no gasket plate required.

It is to be understood, however, that even though numerous characteristics and advantages of the present embodiments have been set out in the foregoing description, together with details of the structures and functions of the embodiments, the disclosure is illustrative only; and that changes may be made in detail, especially in matters of shape, size and arrangement of parts within the principles of the disclosure to the full extent indicated by the broad general meaning of the terms in which the appended claims are expressed.

What is claimed is:

1. A flat panel display, comprising:
   a seat comprising a supporting member, the supporting member comprising a first engaging portion at a top end thereof, the first engaging portion comprising at least one pin and at least one fixing hole;
   a connection member comprising at least one fixing component; and
   a display module pivotably mounted on the supporting member, the display module comprising a second engaging portion comprising at least one positioning slot;
   wherein the at least one pin of the first engaging portion is pivotably received in the second engaging portion, the at least one fixing component extends through the at least one positioning slot and is fixed in the at least one fixing hole thereby movably fixing the second engaging portion against the first engaging portion, and the at least one positioning slot provides a path for guiding movement of the at least one fixing component when the display module is rotated relative to the supporting member about the at least one pin.

2. The flat panel display of claim 1, wherein the second engaging portion comprises a curved plate, and the curved plate has the at least one positioning slot defined therein.

3. The flat panel display of claim 2, wherein the curved plate comprises a first friction surface contacting the first engaging portion, the first friction surface configured to provide friction between the first and second engaging portions.

4. The flat panel display of claim 3, wherein a surface of the first engaging portion which contacts the first friction surface is roughened.

5. The flat panel display of claim 2, wherein the connection member further comprises a gasket plate, and the gasket plate is movably attached to the second engaging member by the at least one fixing component.

6. The flat panel display of claim 5, wherein the curved plate further comprises a second friction surface, the first and second friction surfaces are at opposite sides of the curved plate, the second friction surface is in movable contact with the gasket plate, and the second friction surface configured to provide friction force between the gasket plate and the second engaging portion.

7. The flat panel display of claim 6, wherein a surface of the gasket plate contacting the second friction surface is roughened.

8. The flat panel display of claim 5, wherein the at least one fixing component comprises a post and a head located at an end of the post, the post passes through the at least one positioning slot, and the other end of the post is fixed in the fixing hole.

9. The flat panel display of claim 8, wherein the gasket plate has at least one through hole defined therein, and the at least one through hole is aligned with the at least one positioning slot and the at least one fixing hole.

10. The flat panel display of claim 9, wherein the gasket plate comprises at least one block received in the at least one positioning slot, the at least one through hole spans through the at least one block, and the at least one block is configured to stop the display module from being over-tilted when the block has reached an end of the at least one positioning slot when the display module is rotated.

11. The flat panel display of claim 2, wherein the at least one pin is two pins, the second engaging portion further comprises a first block comprising a first pivot hole and a second block comprising a second pivot hole, and the pins are pivotably received in the first and second pivot holes.

12. A flat panel display, comprising:
a supporting member comprising a first engaging portion, the first engaging portion comprising at least one fixing hole;
a connection member comprising at least one fixing component; and
a display module comprising a second engaging portion, the second engaging portion having at least one positioning slot defined therein, the second engaging portion pivotably mounted on the first engaging portion of the supporting member;
wherein the at least one fixing component passes through the at least one positioning slot and is fixed in the at least one fixing hole thereby movably attaching the second engaging portion of the display module to the first engaging portion of the supporting member, the at least one positioning slot provides guided movement of the at least one fixing component therein in each of two opposite directions such that a tilt angle of the display module is adjustable, and friction between the second engaging portion and the first engaging portion holds the display module at a desired tilt angle.

13. The flat panel display of claim 12, wherein the second engaging portion comprises a curved plate, and the curved plate has the at least one positioning slot defined therein.

14. The flat panel display of claim 13, wherein the curved plate comprises a first friction surface contacting the first engaging portion, the first friction surface configured to provide friction force between the first and second engaging portions.

15. The flat panel display of claim 14, wherein a surface of the first engaging portion which contacts the first friction surface is roughened.

16. The flat panel display of claim 13, wherein the connection member further comprises a gasket plate, and the gasket plate is movably attached to the second engaging member by the at least one fixing component.

17. The flat panel display of claim 16, wherein the curved plate further comprises a second friction surface, the first and second friction surfaces are at opposite sides of the curved plate, the second friction surface is in movable contact with the gasket plate, and the second friction surface configured to provide friction force between the gasket plate and the second engaging portion.

18. The flat panel display of claim 17, wherein a surface of the gasket plate contacting the second friction surface is roughened.

19. The flat panel display of claim 16, wherein each of the at least one fixing component comprises a post and a head located at an end of the post, and the other end of the post passes through the at least one positioning slot and is received in the fixing hole.

20. The flat panel display of claim 19, wherein the gasket plate has at least one through hole defined therein, and the at least one through hole is aligned with the at least one positioning slot and the at least one fixing hole.

\* \* \* \* \*